(12) United States Patent
Reeves et al.

(10) Patent No.: US 9,049,609 B1
(45) Date of Patent: Jun. 2, 2015

(54) DYNAMIC MANAGEMENT OF RETRY TIME PERIOD BASED ON PAST LACK OF SUPPORT FOR PROVIDING A SERVICE

(71) Applicant: Sprint Spectrum L.P., Overland Park, KS (US)

(72) Inventors: Raymond E. Reeves, Oviedo, FL (US); Mark Peden, Olathe, KS (US); Gary Koller, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/189,723

(22) Filed: Feb. 25, 2014

(51) Int. Cl.
| | |
|---|---|
| *H04W 68/00* | (2009.01) |
| *H04W 4/22* | (2009.01) |
| *H04W 92/00* | (2009.01) |
| *H04W 24/02* | (2009.01) |
| H04W 36/00 | (2009.01) |
| H04W 36/36 | (2009.01) |
| H04W 60/04 | (2009.01) |

(52) U.S. Cl.
CPC .............. *H04W 24/02* (2013.01); *H04W 68/00* (2013.01); *H04W 36/0022* (2013.01); *H04W 36/36* (2013.01); *H04W 60/04* (2013.01)

(58) Field of Classification Search
CPC .. H04W 60/04; H04W 36/36; H04W 36/0022
USPC .................................. 370/252; 455/435, 440
See application file for complete search history.

(56) References Cited

U.S. PATENT DOCUMENTS

| | | | | |
|---|---|---|---|---|
| 7,962,610 | B2* | 6/2011 | Lippincott et al. ............ | 709/224 |
| 2011/0305192 | A1* | 12/2011 | Faccin et al. .................. | 370/328 |
| 2012/0157033 | A1* | 6/2012 | Ou et al. ..................... | 455/404.1 |
| 2013/0136115 | A1* | 5/2013 | Moisanen et al. ............ | 370/338 |

FOREIGN PATENT DOCUMENTS

WO    WO2013/129832 A1 *  9/2013

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 10), Dec. 2010, 3GPP TS36.331 v10.0.0.*
3rd Generation Partnership Project; Technical Specification Group Radio Access Network; Evolved Universal Terrestrial Radio Access Network (E-UTRAN); S1 Application Protocol (S1AP) (Release 9), Sep. 2010, 3GPP TS 36.413 v9.4.0.*

* cited by examiner

*Primary Examiner* — Chi H Pham
*Assistant Examiner* — Shailendra Kumar

(57) ABSTRACT

A method and corresponding system for managing how long a UE will wait before attempting to be served by a RAN, such as before the UE searches for coverage of the RAN and determines whether the RAN supports providing a particular service. The method may apply in a scenario where the RAN is normally configured to provide the particular service but from time to time may lack support for providing that service. As disclosed, a network entity may evaluate past instances of the RAN lacking support for providing the service, and may thereby estimate a typical (e.g., average) duration for such lack of support. Based on that estimate, the network entity may then provide the UE with an indication of how long the UE should wait before the UE attempts to be served by the RAN, and the UE may responsively wait for that time period.

19 Claims, 4 Drawing Sheets

DYNAMIC MANAGEMENT OF RETRY TIME PERIOD BASED ON PAST LACK OF SUPPORT FOR PROVIDING A SERVICE

BACKGROUND

Unless otherwise indicated herein, the materials described in this section are not prior art to the claims and are not admitted to be prior art by inclusion in this section.

A typical radio access network (RAN) includes one or more base stations that radiate to define one or more wireless coverage areas, such as cells and cell sectors, in which user equipment devices (UEs) such as cell phones, tablet computers, tracking devices, embedded wireless modules, and other wirelessly equipped communication devices, can operate. Further, each base station of the RAN may then be coupled or communicatively linked with network infrastructure such as a switch or gateway that provides connectivity with one or more transport networks, such as the public switched telephone network (PSTN) and/or the Internet for instance. With this arrangement, a UE within coverage of the RAN may thus engage in air interface communication with the base station and thereby communicate via the base station with various remote network entities or with other UEs served by the base station.

In general, a RAN may operate in accordance with a particular air interface protocol or radio access technology, with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of UEs, initiation of communications, handoff between coverage areas, and functions related to air interface communication.

In accordance with the air interface protocol, each of the one or more coverage areas of a RAN may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage strength. Further, each coverage area may define a downlink control channel for carrying system information, page messages, and other control signaling from the base station to UEs, and an uplink control channel for carrying service requests and other control signaling from UEs to the base station, and each coverage area may define downlink and uplink traffic channels or the like for carrying other communication traffic between the base station and UEs.

When a UE enters into coverage of a RAN, the UE may detect a reference signal and read system information broadcast from a base station and may then engage in a process to register itself to be served by the RAN. For instance, the UE may transmit an attach message on an uplink control channel to the base station, and the base station and/or supporting infrastructure may then responsively authenticate and authorize the UE for service and establish a record indicating where in the RAN the UE is operating and provide an attach accept message to the UE. Thereafter, the UE may then be served by the RAN in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may have particular traffic channel resources assigned by the RAN, which the UE may use to engage in communication of bearer traffic and the like.

OVERVIEW

As a general matter, a RAN may be configured to provide UEs with service of various types, such as data communication service, voice telephony service, text messaging service, and the like. However, for various reasons from time to time, the RAN may lack support for providing a particular service that the RAN is normally configured to provide. For instance, a network element that enables the RAN to provide a particular service may from time to time undergo network maintenance or replacement and may therefore be unavailable, which may prevent the RAN from providing UEs with that particular service during that time.

Further, a UE may be configured to decide, based on whether the RAN supports providing a particular service, whether the UE should register to be served by the RAN. For instance, the RAN may broadcast system information that indicates whether the RAN currently supports providing a particular service, and when a UE detects coverage of the RAN, the UE may thus determine from the system information broadcast by the RAN whether the RAN currently supports providing that particular service. If the UE thereby determines that the RAN currently supports providing that service, then the UE may responsively register to be served by the RAN. But if the UE thereby determines instead that the RAN does not currently support providing that service, then the UE may decide to not register to be served by the RAN and may instead resort to registering to be served by another RAN that can provide the UE with the particular service.

In addition, a UE may be configured to prefer one RAN over another for various reasons. For instance, the UE may be configured to prefer one RAN over another because one RAN is operated by a wireless service provider to which the UE subscribes for service and the other RAN is operated by a roaming partner service provider. Or the UE may be configured to prefer one RAN over another because one RAN provides more advanced service, such as higher speed data communications, than the other. However, even though the UE may generally prefer one RAN over another, the UE may still be configured to forgo registering for service with a more preferred RAN if that more preferred RAN does not currently support a service that is deemed particularly important.

Thus, if the UE detects coverage of a first, preferred RAN, the UE may then determine whether that first RAN currently supports providing a particular service and, based on that determination, may decide whether to register to be served by the first RAN or rather to resort to registering to be served by a second, less preferred RAN that provides coverage at the UE's location and that does support providing the service. If the UE determines that the first RAN currently supports providing the service, then the UE may then register to be served by the first RAN. However, if the UE determines that the first RAN does not currently support providing the service, then the UE may decide to not register to be served by the first RAN and may instead resort to registering to be served by the second, less preferred RAN, so that the UE can have access to the service at issue.

Given the UE's general preference for being served by the first RAN, the UE may also be configured to apply a retry timer that defines how long the UE should wait before the UE checks again for coverage of the first RAN and to determine if the first RAN now supports the service at issue. Thus, once the UE decides to not register to be served by the first RAN and perhaps decides instead to be served by the second RAN, the UE may begin decrementing that retry timer. And upon expiration of the retry timer, the UE may then again search for coverage of the first RAN and determine if the first RAN now supports the service at issue, repeating the process as described above.

Such a retry timer may be set to a default value that is deemed to be long enough to avoid having the UE re-scan for the first RAN so often that the UE wastes battery power, and, in a scenario where the UE has resorted to being served by the second RAN, to help ensure that the UE stays served by the second RAN so that the UE can have access to the service at issue. By way of example, the retry timer may be set to a default value of one hour. Unfortunately, however, such a long retry timer may by definition also prevent the UE from being served by the first RAN for that full retry-timer period of time, even if the first RAN resumes supporting the service at issue well before the expiration of the retry-timer period.

A good example of this problem may arise in a hybrid wireless communication system that includes two RANs and functionality to interwork between the RANs so as to facilitate "circuit switched fallback" (CSFB) service. In such a system, the first RAN may provide LTE service to support mobile broadband communication, and the second RAN, which may be co-owned/operated with the first RAN, may function as a fallback RAN, to provide UEs with providing legacy CDMA or GSM service for instance, to support traditional voice calls. Further, an interworking server (IWS) may function as an intermediary to pass signaling between the RANs.

With this arrangement, a UE that subscribes to service of such a system may then be configured to operate by default on the LTE RAN in order to beneficially engage in high speed data communications. Thus, upon detecting presence of the LTE RAN, the UE may register to be served by the LTE RAN. And to place or receive a voice call, the UE may then conveniently engage in a CSFB process by which the UE engages in voice call setup signaling with the fallback RAN through the LTE air interface, the LTE network, and the IWS, and the UE then conveniently transitions to be served by the fallback RAN and to engage in the voice call.

To facilitate this, the LTE RAN may be configured to support providing CSFB service. For instance, the LTE base station that serves the UE may be configured to receive from the UE a CSFB call setup request message (e.g., "extended service request" message), and the LTE RAN may be configured to pass such a message to the IWS for processing by the fallback network to facilitate call setup. Further, the LTE RAN may be configured to pass other such CSFB related signaling between the IWS and the UE, to facilitate setup of CSFB calls for the UE.

In an arrangement like this, the LTE RAN support for providing CSFB service may be particularly important, as it may enable the UE to place emergency voice calls, such as 9-1-1 calls for instance. Thus, if for some reason the LTE RAN loses support for providing CSFB service, such as if the IWS becomes unavailable or the base station or supporting network infrastructure becomes unable to process CSFB signaling for the UE, it may be desirable for the UE to avoid being served by the LTE RAN and for the UE to instead be served directly by the fallback RAN, so that the UE can engage in voice call setup signaling directly with the fallback RAN.

To manage this, the LTE RAN may broadcast as system information an indication of whether the RAN currently supports providing CSFB service. For instance, this indication may include a System Information Block #8 (SIB8) that indicates information about the fallback network, to enable the UE to scan for coverage of the fallback network as part of the CSFB process. Further or alternatively, this information may include a particular flag or message in a SIB8 or the like, such as a "CSFB-RegistrationParam1XRTT" information element for instance, the presence of which indicates RAN support for providing CSFB service.

When a UE detects coverage of the LTE RAN, the UE may then read system information broadcast by the LTE RAN, to determine whether the LTE RAN currently supports providing CSFB service, such as to determine whether the LTE RAN is broadcasting a SIB8 and/or is providing a flag or message that indicates support for providing CSFB service. If the UE thereby detects that the LTE RAN currently supports providing CSFB service, then the UE may register to be served by the LTE RAN. Further, when the UE registers with the LTE RAN, signaling may also pass through the LTE RAN to register the UE with the fallback RAN as well, so as to facilitate subsequent CSFB signaling between the UE and the fallback RAN. Whereas, if the UE thereby determines that the LTE RAN does not currently support providing CSFB service, then the UE may decide to not register to be served by the LTE RAN and the UE may instead register to be served directly by the fallback RAN.

In line with the discussion above, the UE in this process may be configured to apply a retry timer that indicates how long the UE should wait before the UE checks back to see if the LTE RAN now supports providing CSFB service, and such a retry timer may be set to a default value such as one hour for instance. Thus, in deciding to not register to be served by the LTE RAN and instead registering to be served directly by the fallback RAN, the UE may start that retry timer. And when the retry timer expires, the UE may then search for LTE coverage and determine if the LTE RAN now supports CSFB service.

In this process, as in the general process described above, having a fixed retry time period may be undesirable. Here, for instance, if the retry time period is too short, the UE may too often check for LTE RAN coverage and CSFB support, which may drain the UE's battery, and if the retry period is too long, it is possible that the LTE RAN may resume support for providing CSFB service well before the expiration of the retry period, in which case the UE may miss out on the preferred LTE service for longer than necessary. Consequently, an improvement is desired.

Disclosed herein is a method and corresponding system for managing how long a UE will wait before attempting to be served by a RAN (e.g., before searching for coverage of the RAN and determining whether the RAN supports providing a particular service). The method may apply in a scenario where the RAN is normally configured to provide a particular service but from time to time may lack support for providing that service. In accordance with the method, a network entity may evaluate past instances of the RAN lacking support for providing the service, and may thereby estimate a typical (e.g., average) duration for such lack of support. Based on that estimate, the network entity may then provide the UE with an indication of how long the UE should wait before the UE attempts to be served by the RAN, and the UE may responsively wait for that time period.

For instance, if the network entity determines that a typical duration for the RAN lacking support for providing the service is 40 minutes, the network entity may determine that an appropriate wait time is 40 minutes, and so the network entity may direct the UE to apply a 40-minute retry timer when the UE decides to not register with the RAN due to the RAN lacking support for providing that service. Further, in determining an appropriate wait time for a given UE, the network entity may take into consideration how much time has passed since a last indication of the RAN lacking support for providing the service. For instance, if the network entity directed another UE to wait 40 minutes due to a report from the other UE about 10 minutes ago that the RAN lacks support for providing the service, the network entity may then direct the given UE to apply a retry timer of just 30 minutes, on grounds that only 30 minutes remains in the determined typical duration of the RAN lacking support for providing the service.

Accordingly, in one respect, disclosed is a method of managing how long a UE waits before attempting to be served by a RAN, where the RAN is normally configured to provide a service but from time to time lacks support for providing the service. Such a method may involve (i) a network entity estimating a duration that the RAN tends to lack support for providing the service, where the estimating is based on an evaluation by the network entity of how long past instances of the RAN lacking support for providing the service lasted, (ii) the network entity determining, based on the estimated duration, a period of time that the UE should wait before the UE attempts to be served by the RAN, and (iii) causing the UE to wait for the determined period of time before the UE attempts to be served by the RAN.

Further, in another respect, disclosed is a server that comprises a network interface, a processor, non-transitory data storage, and program instructions stored in the data storage and executable by the processor to control how long a user equipment device (UE) waits, after the UE determines that a RAN does not support providing a service, before the UE seeks to again determine whether the RAN supports providing the service. In particular, the program instructions of such a server may be executable by the processor to (i) receive via the network interface notifications of when RAN lacks support for providing the service and when the RAN supports providing the service, (ii) based on the notifications, identify past instances of the RAN lacking support for providing the service, (iii) estimate a duration that the RAN tends to lack support for providing the service, where the estimating is based on an evaluation of how long the identified past instances lasted, (iv) based on the estimated duration, determine a period of time that the UE should wait before seeking to again determine whether the RAN supports providing the service, and (v) transmitting via the network interface a directive to cause the UE to wait the determined period of time before the UE seeks to again determine whether the RAN supports providing the service.

And still further, disclosed is a method that specifically involves managing how long a UE waits before attempting to be served by an LTE RAN, where the LTE RAN normally provides CSFB service through which UEs initiate voice calls on a fallback RAN by signaling through the LTE RAN, but from time to time the LTE RAN lacks support for providing the CSFB service. As disclosed, this method involves (i) estimating a duration that the LTE RAN tends to lack support for providing the CSFB service, where the estimating is based on evaluation of how long past instances of the LTE RAN lacking support for providing the CSFB service lasted, (ii) based on the estimated duration, determining a period of time that the UE should wait before the UE attempts to be served by the LTE RAN, and (iii) causing the UE to wait for the determined period of time before the UE attempts to be served by the LTE RAN.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
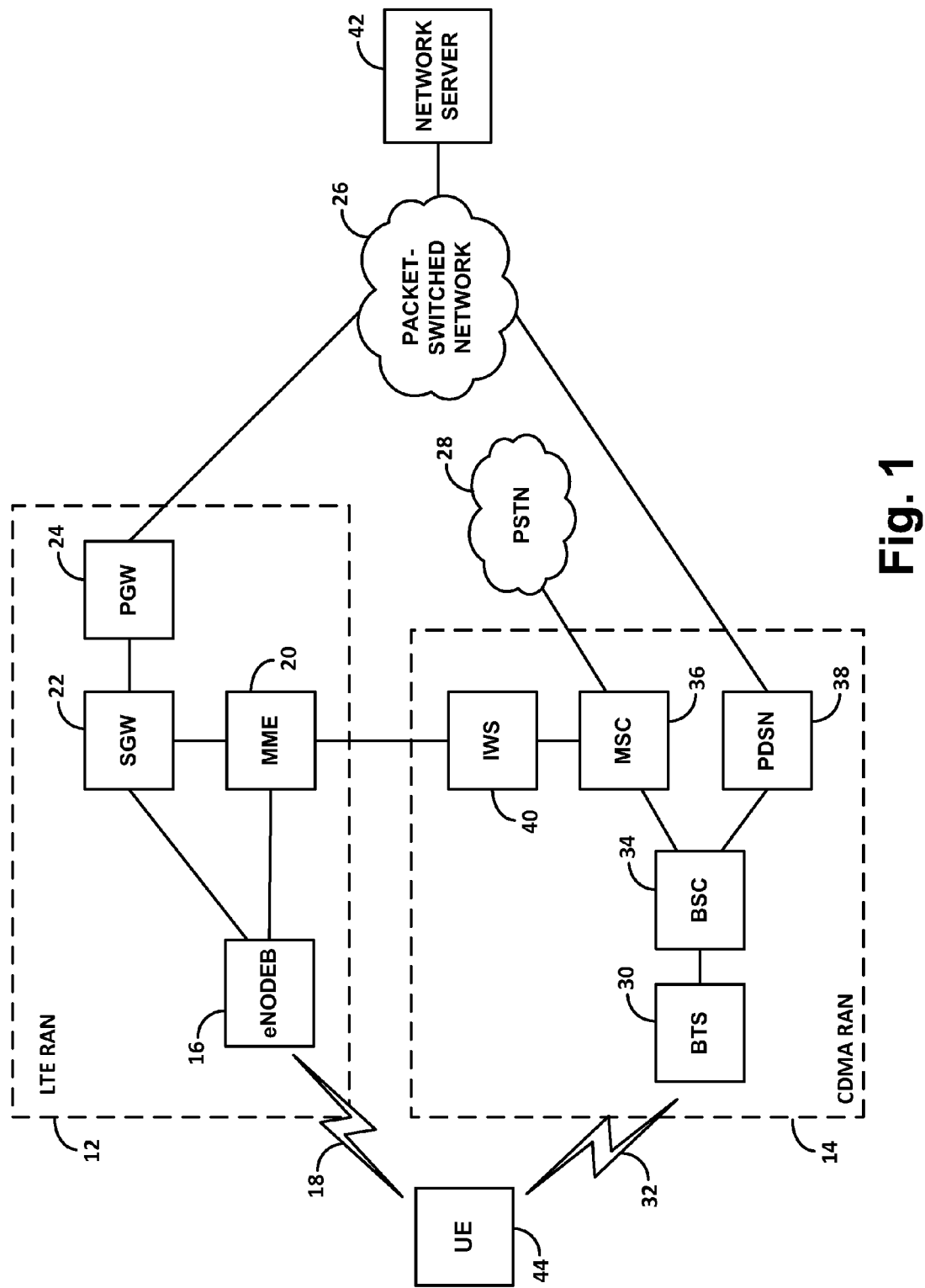
FIG. 1 is a simplified block diagram of a network arrangement in which aspects of the present disclosure can be implemented.

The present method and system will be described by way of example in the context of a hybrid LTE/CDMA system like that discussed above, with the service at issue being CSFB. However, it should be understood that principles described herein can apply as well in numerous other contexts, such as in numerous other RAN arrangements and with respect to numerous other services. Further, it should be understood that the various arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

As noted above, FIG. 1 is a simplified block diagram of the example system, including an LTE RAN 12 and a CDMA RAN 14. In the example system, the LTE RAN primarily serves UEs with wireless packet data communication service. Whereas the CDMA RAN primarily serves UEs with wireless circuit-switched voice call service but may also provide packet-data communication service and other types of service. These RANs may be owned or operated by a common wireless service provider, which may enable the provider to serve UEs with high speed packet data service through the LTE RAN and traditional cellular voice call service through the CDMA RAN.

The LTE RAN 12 in the example system is shown including a representative LTE base station 16 known as an eNodeB, which includes an antenna structure and associated equipment for providing an LTE coverage area 18 in which UEs can be served by the eNodeB and thus by the LTE RAN. The eNodeB is then shown having a communication interface with a mobility management entity (MME) 20 that functions as a signaling controller for the LTE RAN. Further, the eNodeB is also shown having a communication interface with a serving gateway (SGW) 22, which is in turn shown having a communication interface with a packet-data network gateway (PGW) 24 that provides connectivity with a packet-switched network 26, and the MME is shown having a communication interface with the SGW. In practice, the illustrated components of the LTE RAN may sit as nodes on a private packet-switched network owned by an operator of the LTE RAN, and thus the various communication interfaces may be virtual interfaces through that network.

The CDMA RAN 14, on the other hand, is shown including a representative CDMA base station 30 known as a base transceiver station (BTS), which includes an antenna structure and associated equipment for providing a CDMA coverage area 32 in which UEs can be served by the BTS and thus by the CDMA RAN. The BTS is then shown in communication with a base station controller (BSC) 34, which is in turn shown in communication with a mobile switching center (MSC) 36 that provides connectivity with the PSTN 28 and in communication with a packet data serving node (PDSN) 38 that provides connectivity with the packet-switched network 26.

Further shown in FIG. 1 is then an IWS 40, which serves as a signaling intermediary between the LTE RAN and the CDMA RAN to facilitate functions such as CSFB. The IWS may be provided as an element of either one of the RANs or as an element separate from but connected to each RAN, and in a representative arrangement as shown has a communication interface with the MME of the LTE RAN on one hand and a communication interface with the MSC of the CDMA RAN on the other hand. In an example configuration, the IWS may be integrated with the MSC of the CDMA RAN. But other arrangements are possible as well.

Shown sitting as a node on the packet-switched network in this arrangement is a network server 42. This network server will be described herein as being an entity that carries out various functions of the present method, such as estimating the typical duration that the LTE RAN lacks CSFB service and causing a UE to apply a retry timer based on that estimated duration. It should be understood, however, that some or all of the functions described herein as being carried out by that network server 42 could instead be carried out by one or more other entities, such as by the eNodeB 16, the MME 20, or the IWS 40 for instance.

FIG. 1 illustrates a representative UE 44 located within both coverage area 18 of the LTE RAN and coverage area 32 of the CDMA RAN. This representative UE is a hybrid telephony device (e.g., cell phone or other such device), equipped to support both LTE service and CDMA service and is thus capable of being served by both the LTE RAN and the CDMA RAN and engaging in voice calls served the LTE RAN and voice calls served by the CDMA RAN. In practice, the UE may be configured to prioritize being served by the LTE RAN as discussed above. Thus, upon entry into coverage area 18 of the LTE RAN, even though CDMA coverage exists there too, the UE attach with the eNodeB by engaging in attach signaling with the eNodeB and in turn with the MME 20. Further, in normal operation with this arrangement, when the UE attaches with the eNodeB, the MME may engage in signaling with the IWS 40 and in turn with the MSC 36 to also register the UE with the CDMA RAN.

Although FIG. 1 illustrates only one UE, in practice numerous similar UEs may from time to time operate in similar coverage and carry out functions similar to those described herein as being carried out by the representative UE.

In the example arrangement of FIG. 1, we may assume that the LTE RAN (e.g., eNodeB 16, MME 20, and/or one or more other entities of the LTE RAN) is normally configured to support providing CSFB service, such as with each involved component of the LTE RAN being programmed with control logic to cause the component to carry out certain CSFB related functions. According to this normal configuration, for instance, the eNodeB may regularly broadcast a SIB8 message containing a CSFB-RegistrationParam1XRTT information element so that a UE considering registering to be served by the eNodeB can determine if CSFB service would be available. Further, when a UE that is being served by the eNodeB seeks to place a voice call, the UE may transmit an extended service request message to the eNodeB, the eNodeB may pass that message along to the MME, and the MME may pass that message along to the IWS, to facilitate setup of the requested call by the CDMA RAN. And likewise, when the MSC of the CDMA RAN has a voice call to connect to the UE and sends a CSFB page message via the IWS to the MME of the LTE RAN, the MME may responsively cause the eNodeB to page the UE, and the eNodeB, MME, and IWS may handle additional CSFB related signaling to facilitate setup of the CSFB call.

As noted above, however, at times for various reasons the LTE RAN may lack support for providing CSFB service. For instance, at times, as network components such as any of those noted above might be subject to network maintenance, such as upgrades or the like, which may render the component temporarily unavailable and thus preclude certain functionality that relies on the component. Further, various interfaces of the LTE RAN that support communication between network components may experience similar temporary outages.

In a scenario where CSFB signaling cannot flow properly between a UE and the CDMA network via the UE's serving eNodeB, the MME, and the IWS, or otherwise when CSFB becomes unavailable via one or more eNodeBs or associated entities, the LTE RAN may be considered to be experiencing a lack of support for providing CSFB service. Thus, the LTE RAN may have various different instances of lacking support for providing CSFB service from time to time. For instance, if the LTE RAN has multiple eNodeBs, it is possible that at one time one of the eNodeBs might temporarily lack support for providing CSFB service, thus defining an example instance of the LTE RAN lacking support for providing CSFB service even though another eNodeB might still support providing CSFB service, and at another time the other eNodeB might temporarily lack support for providing CSFB service, thus defining another example instance of the LTE RAN lacking support for providing CSFB service.

In an example implementation of the present method, network server 42 may evaluate how long various instances of the LTE RAN experiencing a lack of support for providing CSFB service have lasted and may statistically analyze that information as a basis to derive an estimate of a duration that the LTE RAN typically lack support for providing CSFB service per instance, i.e., a duration that the RAN tends to lack support for providing CSFB service. For instance, the network server may average the per-instance durations to establish the estimate, or may take another statistical measure, perhaps also accounting for other factors such as time of day, types of network equipment, and the like. Further, to the extent the network server is estimating how long a particular eNodeB tends to lack support for providing CSFB service, the network server could take into account past instances of lack of such support by similarly situated eNodeBs, such as other eNodeBs in the same region, at the same time of day, of the same brand, or the like.

To enable the network server 42 to perform this evaluation, the network server may receive notifications (in a push or pull process) from various entities, such as from one or more UEs, one or more eNodeBs, one or more MMEs, one or more IWSs, and the like, the notifications specifying when the LTE RAN lacked support for providing CSFB service and when the LTE RAN supported providing CSFB service. And the network server may tabulate the information from those notifications to derive its estimate of the typical duration.

One example source for these notifications is UEs that detect from time to time whether or not the LTE RAN supports providing CSFB service. In practice, for instance, when a UE such as UE 44 detects coverage of the LTE RAN, such as of eNodeB 16 for instance, the UE may determine whether the LTE RAN currently supports providing CSFB service. For example, the UE may determine whether the eNodeB is broadcasting a SIB8 with the CSFB information element. And as discussed above, (i) if the UE determines that the LTE RAN currently supports CSFB providing service, then the UE may register to be served by the LTE RAN or (ii) if the UE determines that the LTE RAN does not currently support providing CSFB service, then the UE may instead register to be served directly by the CDMA RAN and start its retry timer. Further, if the UE registers to be served with the LTE RAN and at some point detects that the LTE RAN does not support providing CSFB service, such as by trying and failing to place a CSFB call, the UE may at that point deregister from the LTE RAN and instead register to be served directly by the CDMA RAN.

When the UE detects that the LTE RAN lacks support for providing CSFB service, the UE may transmit to the network server 42 a notification indicating that detected lack of support, optimally with a timestamp indicating when the lack of support was detected, and perhaps indicating the serving eNodeB and other information. The UE may provide this notification via the LTE RAN if the UE is still served by the LTE RAN, e.g., before the UE resorts to transitioning to be served directly by the CDMA RAN. Alternatively, the UE may provide this notification via the CDMA RAN after the UE transitions to be served directly by the CDMA RAN. Further, if and when the UE ultimately determines that the eNodeB supports providing CSFB service, such as upon detecting the SIB8 and CSFB information element broadcast from the LTE RAN and/or successfully setting up a CSFB call when served by the LTE RAN. And the UE may transmit to the network server a notification of such detected support for providing CSFB service. The UE may provide these notifications in any form that the server 42 would be able to receive and interpret, and perhaps to which the server 42 could respond, such as using Hypertext Transfer Protocol (HTTP) for instance.

Further, another example source for the notifications to the server is eNodeBs such as eNodeB 16. Such an eNodeB may be programmed with a type of UE emulator or other logic that simulates CSFB functions of a UE, and may from time to time thereby determine, just as the UE would determine, if the LTE RAN currently supports providing CSFB service. Further or alternatively, the eNodeB may regularly evaluate its own operation and/or probe to determine if the MME and/or IWS supports providing CSFB as a basis to determine if the eNodeB supports providing CSFB service, and/or the eNodeB may be informed by the MME or another element, or by network engineers, when CSFB support exists or does not exist. And the eNodeB may likewise generate and provide notifications to the server 42 indicating when the LTE RAN supports or does not support providing CSFB service. Further, when the eNodeB determines that the LTE RAN supports providing CSFB service, the eNodeB may set itself to broadcast the SIB8 and CSFB information element, and when the eNodeB determines that the LTE RAN does not support providing CSFB service, the eNodeB may set itself to not broadcast the SIB8 and CSFB information element.

Still other examples of sources for such notifications may include the MME or the IWS, or perhaps even the MSC, perhaps among other possibilities.

As the network server 42 receives these notifications, the network server may evaluate the notifications to identify discrete instances of when the LTE RAN lacked support for providing CSFB service, such as discrete intervals of time each between a report that the LTE RAN lacked support for providing CSFB service and a report that the LTE RAN supported providing CSFB service. And the network server may record the duration of each such instance.

From time to time, the network server may then statistically combine those durations, such as by averaging them or computing another statistical measure, to derive an estimate of a typical duration of the LTE RAN lacking support for providing CSFB service, so as to facilitate then causing a UE to wait for an appropriate period of time before attempting to be served by the LTE RAN. For instance, the network server may derive such an estimate each time the network server receives a report of the LTE RAN supporting CSFB service following an earlier report of the LTE RAN lacking support for providing CSFB service. Or the network server may derive the estimate at other times and in response to other triggering events.

The network server may then determine, based on the estimated typical duration, a time period that a UE should wait before the UE attempts to be served by the LTE RAN, and may provide an indication of that determined time period for receipt and use as a retry timer period by the UE. This process may take various forms.

As one example, the network server may determine the time period to be the estimated typical duration or may derive the time period in some other manner based on estimated typical duration, and the network server may transmit to the LTE RAN a specification of the determined time period for broadcast by the LTE RAN as system information. For instance, the network server may transmit a specification of the determined time period to PGW 24, and the specification may pass in turn to the SGW 22, to the MME 20, and to the eNodeB 16. And the eNodeB may then broadcast the determined time period as a retry-timer setting in system information. UEs in coverage of the eNodeB may then receive that system information, read the indicated retry-timer period, and use the retry-timer period when deferring or leaving service of the LTE RAN, such as when beginning to be served directly by the CDMA RAN instead.

As another example, the network server may similarly determine the time period and may transmit a specification of the determined time period to a UE such as UE 44 in response to a report from the UE that the LTE RAN lacks support for providing CSFB service. In particular, the UE and the network server may engage in a message exchange, in which the UE transmits to the network server a notification reporting that the LTE RAN lacks support for providing CSFB service and the network server transmits a response to the UE, and the network server may include the specification of the determined time period in that response to the UE, so that the UE may read the response and set itself to use the indicated time period as a retry-timer period.

And as still another example, the network server may determine the time period by offsetting the estimated typical duration by an amount of time that has passed since a last or other previous time the LTE RAN lacked support for providing CSFB service, since the assumption may be in that situation that the typical duration of lack of support has already run its course for at least that amount of time. For instance, as noted above, if the typical duration is 40 minutes, and the network server received a notification indicating that 10 minutes ago the LTE RAN lacked support for providing CSFB service, then the network server may determine the period of time to be 30 minutes, i.e., the difference between the estimated duration and the amount of time since a last reported lack of support for providing CSFB service. This particular example may apply well in the scenario where the network server transmits a specification of the determined time period to a UE in response to a UE reporting that the LTE RAN lacks support for providing CSFB service, so as to further help the UE wait an appropriate period of time before the UE attempts to be served by the LTE RAN.

Advantageously through this process, when a UE defers being served by the LTE RAN or transitions from being served by the LTE RAN on grounds that the LTE RAN lacks support for providing CSFB service, the UE may apply a retry timer that has been dynamically determined based on an evaluation of how long the LTE RAN tends to lack support for providing such service, rather than applying a default retry timer.

Figure 2:
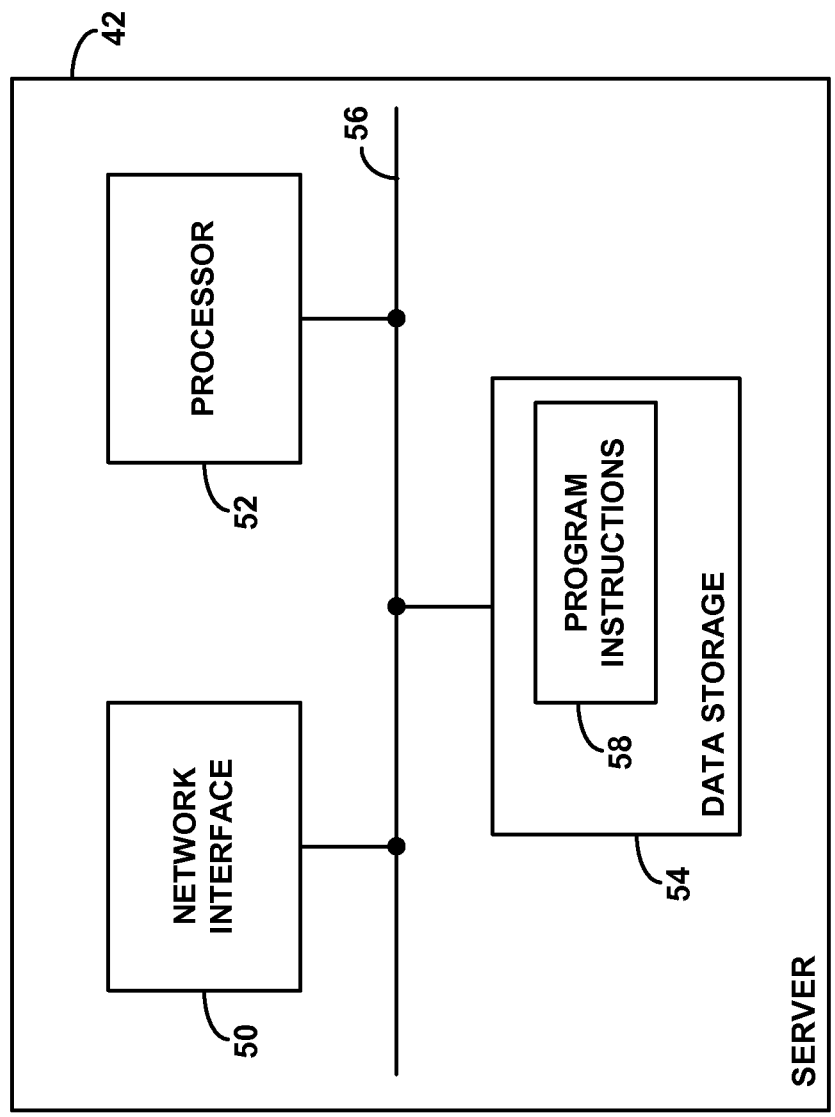
FIG. 2 is a simplified block diagram of a network server operable in the arrangement of FIG. 1.

FIG. 2 is next a simplified block diagram of an example of network server 42, showing some of the components that may be included in such a server to facilitate carrying out functions of the present method. As shown in FIG. 2, the example server includes a network interface 50, a processor 52, and non-transitory data storage 54, all of which may be communicatively linked together by a system bus, network, or other connection mechanism 56. Further, although these components are shown as discrete blocks in the figure, in practice the components could be integrated together in various ways and/or distributed, replicated, or arranged in some other manner.

Network interface 50 may function to facilitate communication with various other entities via packet-switched network 26, such as entities of the LTE RAN, entities of the CDMA RAN, and UEs such as UE 44. As such, the network interface 50 may include one or more network interface modules, such as Ethernet network interface modules for instance, or may take any of a variety of other forms, supporting wireless and/or wired communication according to any of a variety of network communication protocols.

Processor 52 may then comprise one or more general purpose processors (such as microprocessors) and/or one or more special purpose processors (e.g., application specific integrated circuits). And data storage 54 may comprise one or more volatile and/or non-volatile storage components, such as optical, magnetic, or flash storage. As shown, data storage 54 may hold program instructions 58 that are executable by processor 52 to carry out various functions described herein, to help control how long a UE waits, after the UE determines that a RAN does not support providing a particular service, before the UE seeks to again determine whether the RAN supports providing the service.

As such, the program instructions 58 may include instructions that are executable by the processor to (i) receive via the network interface notifications of when RAN lacks support for providing the service and when the RAN supports providing the service, (ii) based on the notifications, identify past instances of the RAN lacking support for providing the service, (iii) estimate a duration that the RAN tends to lack support for providing the service, where the estimating is based on an evaluation of how long the identified past instances lasted, (iv) based on the estimated duration, determine a period of time that the UE should wait before seeking to again determine whether the RAN supports providing the service, and (v) transmitting via the network interface a directive to cause the UE to wait the determined period of time before the UE seeks to again determine whether the RAN supports providing the service. Further, the instructions may be executable by the processor to carry out various other functions as described herein.

Figure 3:
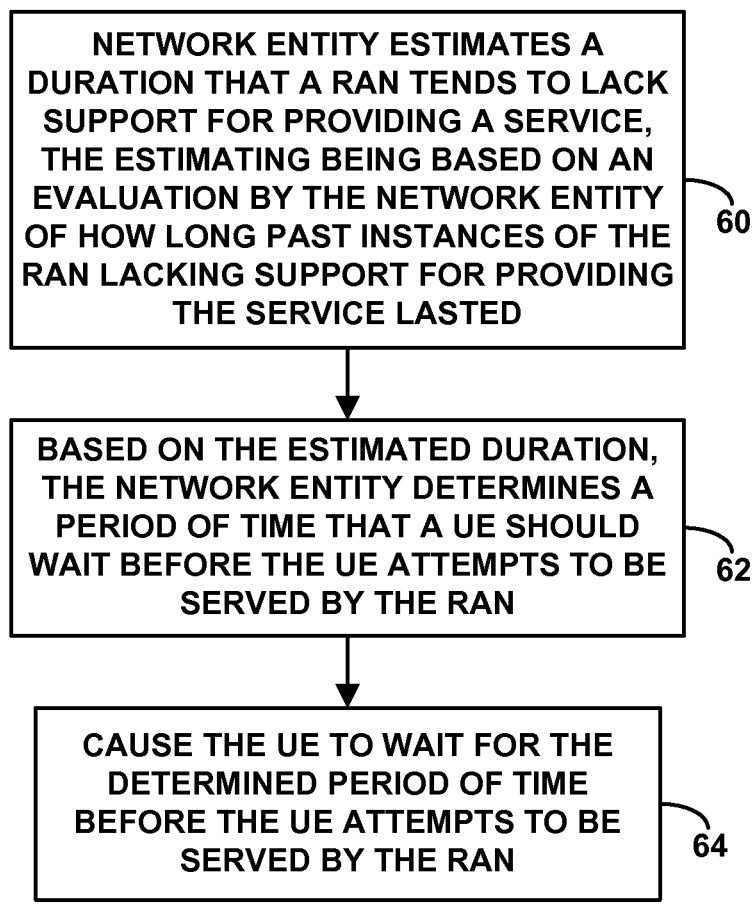
FIG. 3 is a flow chart depicting functions that can be carried out in accordance with the present disclosure.

FIG. 3 is next a flow chart depicting functions that can be carried out in accordance with an example of the present method, to manage how long a UE waits before attempting to be served by a RAN, where the RAN is normally configured to provide a service but from time to time lacks support for providing the service. As shown in FIG. 3, at block 60, the functions include a network entity estimating a duration that the RAN tends to lack support for providing the service, where the estimating is based on an evaluation by the network entity of how long past instances of the RAN lacking support for providing the service lasted. At block 62, the functions then further include, based on the estimated duration, the network entity determining a period of time that the UE should wait before the UE attempts to be served by the RAN. And at block 64, the functions include causing the UE to wait for the determined period of time before the UE attempts to be served by the RAN, such as by transmitting to the UE a specification of the determined period of time as a retry time period for the UE.

Figure 4:
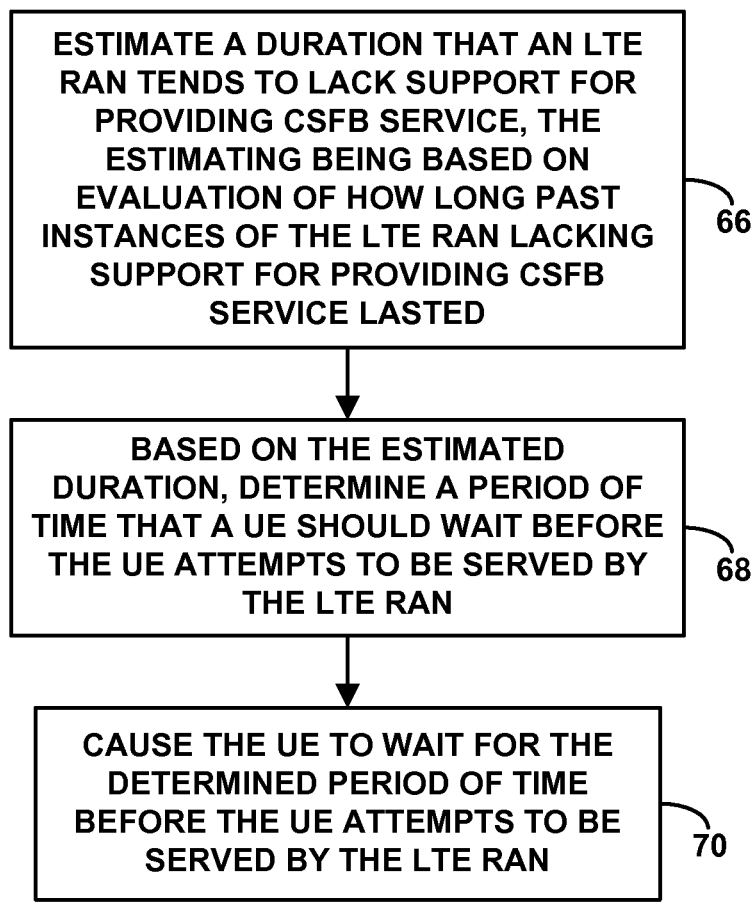
FIG. 4 is another flow chart depicting functions that can be carried out in accordance with the present disclosure.

Finally, FIG. 4 is another flow chart depicting functions that can be carried out in accordance with an example of the present method, to manage how long a UE waits before attempting to be served by an LTE RAN, where the LTE RAN normally provides circuit CSFB service through which UEs initiate voice calls on a fallback RAN by signaling through the LTE RAN, but from time to time the LTE RAN lacks support for providing the CSFB service. The functions of FIG. 4 may be carried out by a network server such as server 24 and/or by one or more other entities.

As shown in FIG. 4, at block 66, the functions include estimating a duration that the LTE RAN tends to lack support for providing the CSFB service, where the estimating is based on evaluation of how long past instances of the LTE RAN lacking support for providing the CSFB service lasted. At block 68, the functions then include, based on the estimated duration, determining a period of time that the UE should wait before the UE attempts to be served by the LTE RAN. And at block 70, the functions include causing the UE to wait for the determined period of time before the UE attempts to be served by the LTE RAN.

In line with the discussion above, in a scenario where the UE begins to be served directly by the fallback RAN in response to the UE detecting that the LTE RAN lacks support for providing the CSFB service, the function of causing the UE to wait for the determined period of time before the UE attempts to be served by the LTE RAN may involve causing the UE to remain served directly by the fallback RAN for the determined time period before the UE attempts to be served instead by the LTE RAN, such as by providing the UE with a specification of the determined period of time for the UE to apply as a retry-timer period. Further, also in line with the discussion above, the act of the UE attempting to be served by the LTE RAN may involve the UE determining, as a prerequisite for the UE to attach with the LTE RAN, whether the LTE RAN supports providing the CSFB service.

Exemplary embodiments have been described above. Those skilled in the art will understand, however, that changes and modifications may be made to these embodiments without departing from the true scope and spirit of the invention.

We claim:

1. A method of managing how long a user equipment device (UE) waits before attempting to be served by a radio access network (RAN), wherein the RAN is normally configured to provide a service but from time to time lacks support for providing the service, wherein the service comprises circuit switched fallback, the method comprising:
  estimating by a network entity a duration that the RAN tends to lack support for providing the service, wherein the estimating is based on an evaluation by the network entity of how long past instances of the RAN lacking support for providing the service lasted;
  based on the estimated duration, determining by the network entity a period of time that the UE should wait before the UE attempts to be served by the RAN; and
  causing the UE to wait for the determined period of time before the UE attempts to be served by the RAN.

2. The method of claim 1, wherein causing the UE to wait for the determined period of time before the UE attempts to be served by the RAN comprises transmitting to the UE a specification of the determined period of time as a retry time period for the UE.

3. The method of claim 1, wherein estimating the duration that the RAN tends to lack support for providing the service comprises:
  identifying the past instances of the RAN lacking support for providing the service;
  determining how long the identified past instances lasted, including determining for each past instance how long the past instance lasted; and
  computing, as the duration, a statistical measure based on the determining of how long the identified past instances lasted.

4. The method of claim 3, wherein identifying the past instances of the RAN lacking support for providing the service comprises receiving notifications indicating when the RAN supported providing the service and when the RAN lacked support for providing the service, wherein the identifying is based on the received notifications.

5. The method of claim 1, wherein determining the period of time based on the estimated duration comprises determining as the period of time the estimated duration.

6. The method of claim 1, wherein determining the period of time based on the estimated duration comprises:
  determining an amount of time that has passed since a last indication of the RAN lacking support for providing the service; and
  determining as the period of time a difference between the estimated duration and the determined amount of time.

7. The method of claim 1, further comprising engaging by the network entity in a message exchange with the UE, the message exchange including (i) receiving from the UE a message that reports that the RAN lacks support for providing the service and (ii) transmitting to the UE a response to the received message,
  wherein causing the UE to wait for the determined period of time before the UE attempts to be served by the RAN comprises specifying the determined period of time in the response to the received message.

8. The method of claim 1, wherein causing the UE to wait for the determined period of time before the UE attempts to be served by the RAN comprises causing a base station serving the UE to broadcast the determined period of time as an operational parameter of the base station.

9. A server comprising:
  a network interface;
  a processor;
  data storage; and
  program instructions stored in the data storage and executable by the processor to control how long a user equipment device (UE) waits, after the UE determines that a radio access network (RAN) does not support providing a service, before the UE seeks to again determine whether the RAN supports providing the service,
  wherein the program instructions include instructions executable by the processor to (i) receive via the network interface notifications of when RAN lacks support for providing the service and when the RAN supports providing the service, (ii) based on the notifications, identify past instances of the RAN lacking support for providing the service, (iii) estimate a duration that the RAN tends to lack support for providing the service, wherein the estimating is based on an evaluation of how long the identified past instances lasted, (iv) based on the estimated duration, determine a period of time that the UE should wait before seeking to again determine whether the RAN supports providing the service, and (v) transmit via the network interface a directive to cause the UE to wait the determined period of time before the UE seeks to again determine whether the RAN supports providing the service,
  wherein the RAN is a Long Term Evolution (LTE) RAN, and wherein the service is circuit switched fallback (CSFB) service.

10. The server of claim 9,
  wherein the instructions further include instructions executable by the processor to determine an amount of time that has passed since a preceding time that the RAN lacked support for providing the service, and
  wherein determining the period of time that the UE should wait before seeking to again determine whether the RAN supports providing the service is based further on the determined amount of time.

11. A method of managing how long a user equipment device (UE) waits before attempting to be served by a Long Term Evolution (LTE) radio access network (RAN), wherein the LTE RAN normally provides circuit switched fallback (CSFB) service through which UEs initiate voice calls on a fallback RAN by signaling through the LTE RAN, but from time to time the LTE RAN lacks support for providing the CSFB service, the method comprising:
  estimating a duration that the LTE RAN tends to lack support for providing the CSFB service, wherein the estimating is based on evaluation of how long past instances of the LTE RAN lacking support for providing the CSFB service lasted;
  based on the estimated duration, determining a period of time that the UE should wait before the UE attempts to be served by the LTE RAN; and
  causing the UE to wait for the determined period of time before the UE attempts to be served by the LTE RAN.

12. The method of claim 11, wherein estimating the duration that the LTE RAN tends to lack support for providing the CSFB service comprises:
  receiving notifications indicating when the LTE RAN supported providing the CSFB service and when the LTE RAN lacked support for providing the service;
  based on the received notifications, determining how long the identified past instances lasted, including determining for each past instance how long the past instance lasted; and computing, as the duration, a statistical measure based on the determining of how long the identified past instances lasted.

13. The method of claim 11, wherein determining the period of time based on the estimated duration comprises:
  determining an amount of time that has passed since a previous indication of the LTE RAN lacking support for providing the CSFB service; and
  determining as the period of time a difference between the estimated duration and the determined amount of time.

14. The method of claim 11, further comprising receiving from the UE a report that the LTE RAN lacks support for providing the CSFB service, wherein causing the UE to wait the determined period of time before the UE attempts to be served by the LTE RAN is done in response to receiving the report.

15. The method of claim 14,
  wherein the UE begins being served directly by the fallback RAN in response to the UE detecting that the LTE RAN lacks support for providing the CSFB service, and
  wherein causing the UE to wait the determined period of time before the UE attempts to be served by the LTE RAN comprises causing the UE to remain served directly by the fallback RAN for the determined time period before the UE attempts to be served instead by the LTE RAN.

16. The method of claim 15, wherein the UE attempting to be served by the LTE RAN comprises the UE determining, as a prerequisite for the UE to attach with the LTE RAN, whether the LTE RAN supports providing the CSFB service.

17. The method of claim 16, wherein the UE determining whether the LTE RAN supports providing the CSFB service comprises the UE determining whether a base station of the LTE RAN broadcasts a message indicative of support for providing the CSFB service.

18. The method of claim 17, wherein the message comprises at least one item selected from the group consisting of a System Information Block #8 (SIB8) message and a CSFB-support flag within the SIB8 message.

19. The method of claim 11, wherein causing the UE to wait for the determined period of time before the UE attempts to be served by the LTE RAN comprises causing a base station serving the UE to broadcast, for receipt by at least the UE, the determined period of time as an operational parameter of the base station.

\* \* \* \* \*